United States Patent [19]

Sakamoto et al.

[11] Patent Number: 5,016,111

[45] Date of Patent: May 14, 1991

[54] TELEVISION SIGNAL RECORDING/REPRODUCING APPARATUS OF COLOR-UNDER RECORDING TYPE

[75] Inventors: Toshiyuki Sakamoto, Fujisawa; Noboru Kojima, Kawasaki; Isao Nakagawa, Yokohama, all of Japan

[73] Assignee: Hitachi, Ltd., Tokyo, Japan

[21] Appl. No.: 271,310

[22] Filed: Nov. 15, 1988

[30] Foreign Application Priority Data

Nov. 27, 1987 [JP] Japan .................................. 62-297450

[51] Int. Cl.$^5$ .............................................. H04N 9/82
[52] U.S. Cl. ..................................... 358/328; 358/329
[58] Field of Search ..................... 358/310, 315–317, 358/327, 328, 329, 335, 336, 340, 21 R, 31, 36

[56] References Cited

U.S. PATENT DOCUMENTS

| | | | |
|---|---|---|---|
| 4,344,082 | 8/1982 | Ishiodori | 358/328 |
| 4,524,380 | 6/1985 | Shibata et al. | 358/329 X |
| 4,607,293 | 8/1986 | Okada et al. | 358/328 |
| 4,612,585 | 9/1986 | Takase et al. | 358/316 |
| 4,658,285 | 4/1987 | Lewis, Jr. | 358/31 X |
| 4,672,468 | 6/1987 | Okada et al. | 358/328 X |
| 4,731,674 | 3/1988 | Fukuda et al. | 358/328 |
| 4,766,486 | 8/1988 | Ozaki | 358/329 X |
| 4,786,978 | 11/1988 | Kawasaki | 358/328 X |

*Primary Examiner*—Roy N. Envall, Jr.
*Assistant Examiner*—W. R. Young
*Attorney, Agent, or Firm*—Antonelli, Terry, Stout & Kraus

[57] ABSTRACT

A television signal recording/reproducing apparatus of the color-under recording type wherein an input composite video signal is separated into a luminance signal and a color signal. For the separated luminance signal, calculation of the interframe signals is executed so that the color signal component remaining in the separated luminance signal is removed by a frame comb filter. And the input signal and the output signal of the frame comb filter are mixed with each other. For the separated color signal, calculation of the interframe signals is executed so that the luminance signal component remaining in the separated color signal is removed by a frame comb filter. And the input signal and the output signal of the frame comb filter are mixed with each other. Each of the signal mixing ratios is controlled in accordance with the interframe level difference in the luminance signal. And the mixed signals are recorded on a recording medium after predetermined recording processes. Mutual interference between the luminance signal and the color signal is eliminated to consequently prevent deterioration of the signal-to-noise ratio while achieving a high image quality.

7 Claims, 5 Drawing Sheets

TELEVISION SIGNAL RECORDING/REPRODUCING APPARATUS OF COLOR-UNDER RECORDING TYPE

BACKGROUND OF THE INVENTION

1. Field of the Invention

The present invention relates to an apparatus for recording and reproducing a television signal (e.g. composite video signal or luminance signal and carrier color signal) and, more particularly, to a recording/ reproducing apparatus such as a video tape recorder (hereinafter referred to as VTR) of color-under recording type with conversion of a carrier color signal into a lower frequency band.

2. Description of the Prior Art

In the known home VTRs currently available for recording and reproducing composite video signal of NTSC system, there is adopted a color-under recording type which converts a carrier color signal into a lower frequency band.

According to such technique, a composite video signal of NTSC system is separated into a luminance signal (Y signal) and a carrier color signal (C signal) frequency-multiplexed in a higher frequency range of 3 to 4 MHz of the luminance signal, and then the carrier color signal (hereinafter referred to simply as color signal) is frequency-converted to a band lower than 1 MHz. Meanwhile, the luminance signal is limited to a band of 2 to 3 MHz and is frequency-modulated to become an FM luminance signal. Subsequently the FM signal thus obtained and the lower-frequency converted color signal are frequency-multiplexed and recorded on a recording medium such as a magnetic tape.

And in a playback mode, the frequency-multiplexed FM luminance signal and lower-frequency converted color signal are separated into individual signals through a high pass filter (HPF) and a low pass filter (LPF). Then, out of the signals thus separated, the FM luminance signal is frequency-demodulated while the lower-frequency converted color signal is inversely converted in such a manner that the color subcarrier frequency is restored to the former frequency. And the color signal is frequency-multiplexed to the higher frequency range of the luminance signal again to resume the original composite video signal.

In such recording technique with conversion of the carrier color signal into a lower-frequency band, the recent trend of employing some improved recording media such as metal tape has made it possible to raise the FM carrier of the FM luminance signal up to a frequency band of 2 MHz or so which is higher than the frequency conventionally used, hence realizing a wide-band recording home VTR to ensure a high resolution of the reproduced picture.

Relative to the conventional VTR signal processing techniques, there are known the following U.S. Patents filed by the present applicant (Hitachi, Ltd.).

U.S. Pat. No. 4,524,380
U.S. Pat. No. 4,613,912
U.S. Pat. No. 4,612,585
U.S. Pat. No. 4,607,293
U.S. Pat. No. 4,672,468
U.S. Pat. No. 4,677,486

In addition to the above, the pending patents are as follows.

U.S. Ser. No. 91,452 (Aug. 1987) now U.S. Pat. No. 4,825,299)
U.S. Ser. No. 113,603 (Oct. 1987) (now U.S. Pat. No. 4,786,986)

In the conventional home VTR, it is customary in a playback mode that, as mentioned, the luminance signal obtained by frequency demodulation and the color signal obtained by inverse frequency conversion are frequency-multiplexed again to resume the original composite video signal.

FIGS. 7A and 7B graphically represent a comparison of the frequency bands, in a pre-recording state and a post-playback state, of a luminance signal and a color signal contained in the composite video signal obtained by a conventional home VTR.

In FIGS. 7A and 7B, Y and C denote a luminance signal and a color signal respectively, and the frequency is taken along the abscissa.

In the pre-recording composite video signal, as shown in FIG. 7A, the frequency band of the luminance signal is lapped over that of the color signal. However, according to the conventional home VTR where the recordable band width for the luminance signal is as narrow as 2 to 3 MHz, the frequency band of the luminance signal is not lapped over the frequency band of the color signal, as shown in FIG. 7B. Accordingly, even if the separation of the composite video signal into the luminance signal and the color signal is incomplete in the recording mode (for example, when the luminance signal is recorded out of the composite video signal limited to a band width of 3 MHz or so by a LPF), it is extremely rare that, in case the post-playback composite video signal is separated again into the luminance signal and the color signal, the color signal component leaks into the separated luminance signal.

However, in the conventional wide-band recording home VTR mentioned above, the band width adapted for recording the luminance signal is extendable to about 4 MHz, so that in the post-playback composite video signal, the frequency band of the luminance signal is extended as indicated by a broken line in FIG. 7B and is thereby lapped over the frequency band of the color signal. Consequently, if the separation of the composite video signal into the luminance signal and the color signal is incomplete in the recording mode, there occurs an undesired phenomenon that, when the post-playback composite video signal is separated again into the luminance signal and the color signal, most of the color signal component leaks into the separated luminance signal. Furthermore, in the playback by the VTR, the luminance signal and the color signal do not exactly satisfy the requirement of frequency interleave relationship due to some time-base variation, so that even with the use of a comb filter for achieving accurate separation into the luminance signal and the color signal, it is still impossible to eliminate leakage of the color signal component into the luminance signal. As a result, in the conventional wide-band recording home VTR, some interference is caused by the harmful influence of the color signal component having leaked into the luminance signal, thereby raising a problem of deterioration in the image quality of the reproduced picture.

Besides the above, in the conventional wide-band recording home VTR where the luminance signal is recorded after frequency modulation as mentioned, triangular noise is increased in accordance with widening of the frequency band to consequently bring about another problem of deterioration in the signal-to-noise ratio with regard to the reproduced signal.

SUMMARY OF THE INVENTION

It is an object of the present invention to provide, by solving the problems observed in the aforementioned prior art, an improved wide-band recording home VTR which is capable of minimizing the mutual interference between the luminance signal and the color signal as well as reducing deterioration of the signal-to-noise ratio to eventually attain an enhanced image quality.

For the purpose of accomplishing the above object, the present invention is so constituted as to comprise at least an input terminal to receive a composite video signal, a line comb filter, a noise reduction circuit (e.g. frame cyclic type), a first frame comb filter for removing the color signal component by interframe calculation, a second frame comb filter for removing the luminance signal component by interframe calculation, first and second mixers, a recording processing circuit, a recording/playback means, and a playback processing circuit.

In the NTSC system where a proper frequency interleave relationship is required between the luminance signal and the color signal, there exists the following relationship between the color subcarrier frequency $f_{sc}$ (about 3.58 MHz) and the horizontal scanning frequency $f_H$ (about 15.734 kHz):

$$f_{sc} = \frac{455}{2} f_H \tag{1}$$

The phase of the color subcarrier is inverted per line. And the relationship between the horizontal scanning frequency $f_H$ and the frame frequency $f_V$ (about 30 Hz) is expressed as:

$$f_H = 525 f_V \tag{2}$$

Thus, according to Eqs. (1) and (2), the phase of the color subcarrier is inverted per frame also.

Therefore the luminance signal with the suppressed color signal component can be extracted by calculating the sum of the signals spaced apart by one line interval or one frame interval, and also the color signal with the suppressed luminance signal component can be extracted by calculating the difference between such spaced signals.

First a description will be given with regard to the operation in a recording mode.

The line comb filter performs interline calculation on the basis of the above relationship with the use of delay circuits provided for individual lines, whereby the composite video signal fed via the input terminal is separated into a luminance signal and a color signal.

Then the noise reduction circuit receives the luminance signal from the line comb filter and extracts the noise component by calculating the signals of which positions are spatially the same but temporally different, thereby removing the noise component from the original luminance signal to consequently suppress the noise without deteriorating the resolution.

Subsequently the first and second frame comb filters perform interframe calculation with the use of delay circuits provided for individual frames, thereby removing the color signal component in the luminance signal inputted from the noise reduction circuit or removing the luminance signal component in the color signal inputted from the line comb filter.

Then the first and second mixers operate to mix the luminance signal received from the line comb filter (via the noise reduction circuit) with the color signal, and also to mix the luminance signal and the color signal obtained respectively from the first and second frame comb filters. During the above operation, the two mixers are controlled by the aforesaid control means in such a manner that, in the still image area where the interframe level difference (amount of interframe motion) of the luminance signal is small, the amounts of mixture of the luminance signal and the color signal obtained respectively from the first and second frame comb filters are increased, while in the motion image area where such level difference is great, the amount of mixture of the luminance signal received from the line comb filter (via the noise reduction circuit) and that of the color signal are increased.

Accordingly, at the respective outputs of the first and second mixers, there can be obtained satisfactory luminance signal and color signal without any mutual interference thereof in the still image area, and also satisfactory luminance signal and color signal without any motion image blur that may otherwise be caused in the motion image area by the interframe calculation.

In the next stage, the recording processing circuit performs frequency modulation and so forth with regard to the luminance signal obtained from the first mixer, and also carrier lower-frequency conversion and so forth with regard to the color signal obtained from the second mixer. And the signals thus processed are recorded by the recording/playback means on a magnetic recording medium such as magnetic tape.

Due to the procedure mentioned above, the present invention is capable of minimizing the mutual interference between the luminance signal and the color signal as well as widely improving the signal-to-noise ratio.

DETAILED DESCRIPTION OF THE PREFERRED EMBODIMENTS

Hereinafter preferred embodiments of the present invention will be described with reference to the accompanying drawings. In the following description, each of the embodiments is an exemplary VTR using a magnetic tape as a recording medium.

Figure 1:
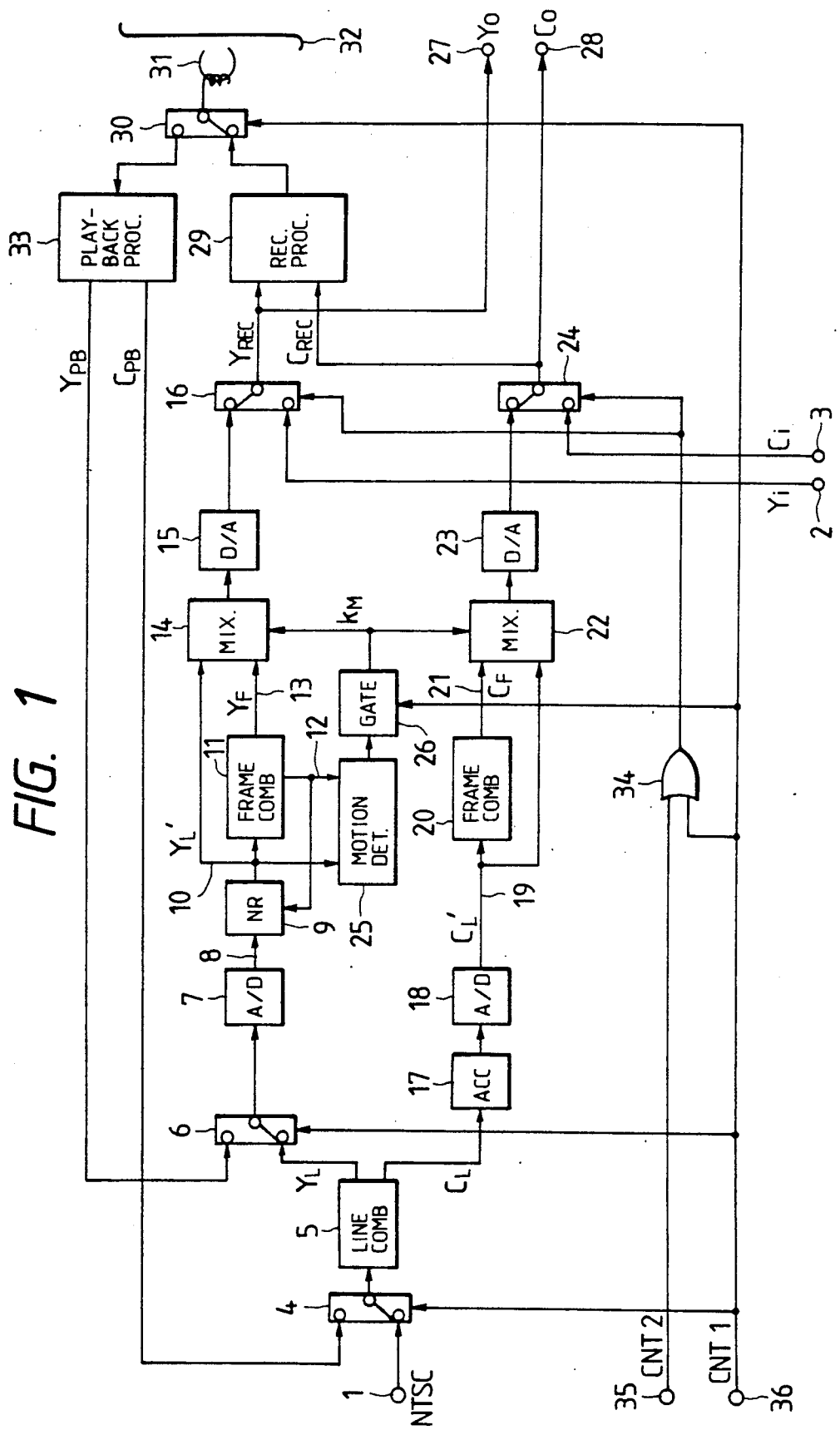
FIG. 1 is a block diagram of a first embodiment according to the present invention.

FIG. 1 is a block diagram of a first embodiment according to the present invention.

In this diagram are shown an input terminal 1 to receive a composite video signal of NTSC system; a luminance signal input terminal 2; a color signal input terminal 3; switching circuits 4, 6, 16, 24 and 30; analog-to-digital converters (hereinafter referred to as A/D converters) 7 and 18; a noise reduction circuit (hereinafter referred to as NR circuit) 9; frame comb filters 11 and 20; mixers 14 and 22; digital-to-analog converters (hereinafter referred to as D/A converters) 15 and 23; an ACC (automatic color control) circuit 17; a motion detector 25; a gate circuit 26; a luminance signal output terminal 27; a color signal output terminal 28; a recording processing circuit 29; a head 31; a magnetic tape 32; a playback processing circuit 33; an OR circuit 34; a second control signal input terminal 35; and a first control signal input terminal 36.

Initially a description will be given with regard to the case of recording the composite video signal NTSC fed via the input terminal 1.

The first control signal CNT1 obtained from the input terminal 36 is a binary signal "1" or "0" which represents a recording mode or a playback mode and is switched in compliance with the requirement of the operator using the apparatus. Such binary signal is supplied as a control signal for selecting the inputs of the switching circuits 4, 6 and 31, and also as a control signal for the gate circuit 26 while being further supplied to one input of the OR circuit 34.

The composite video signal NTSC received via the input terminal is fed to one input of the switching circuit 4, while the playback color signal $C_{PB}$ from the playback processing circuit 33 is introduced to another input of the switching circuit 4, whose output is connected to the input of the line comb filter 5. Therefore, when the first control signal CNT1 has a value (e.g. "0") representing the recording mode, the switching circuit 4 so functions as to introduce the composite video signal NTSC to the input of the line comb filter 5.

The line comb filter 5 consists of an analog line delay circuit and serves to separate the composite video signal NTSC into a luminance signal $Y_L$ and a color signal $C_L$ by utilizing that the phase of the color subcarrier is inverted between lines.

Figure 2:
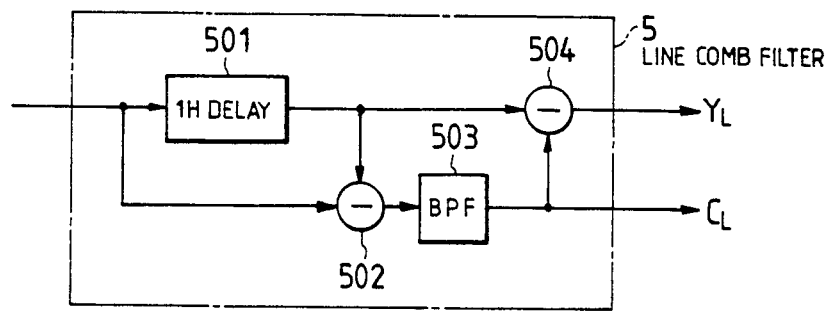
FIG. 2 is a block diagram showing an exemplary constitution of the line comb filter 5 in FIG. 1.

An exemplary constitution of the line comb filter 5 is shown in FIG. 2.

In this diagram are included a 1H delay line 501 (in which H denotes one horizontal scanning interval); subtracters 502 and 504; and a band pass filter (hereinafter referred to as BPF) 503.

The composite video signal NTSC introduced via the switching circuit 4 is fed to the input of the 1H delay line 501 and one input of the subtracter 502 shown in FIG. 2. Then the 1H delay line 501 provides, at its output, a signal delayed by one line from the input signal, and the 1H delay signal thus obtained is fed to another input of the subtracter 502 and one input of the subtracter 504.

The output of the subtracter 502 is supplied to the input of the BPF 503 whose pass band is, for example, $f_{sc} \pm 0.5$ MHz where the color signal is superposed, so that the BPF 503 provides, at its output, a color signal $C_L$ with the supperssed luminance signal component. Such color signal $C_L$ is fed to one output of the line comb filter 5 while being fed also to another input of the subtracter 504. Consequently, at the output of the subtracter 504, there is provided a luminance signal $Y_L$ obtained by removing the color signal component from the composite video signal NTSC. Then the luminance signal $Y_L$ is fed to another output of the line comb filter 5.

Subsequently the color signal $C_L$ obtained from one output of the line comb filter 5 is fed to the input of the ACC circuit 17 shown in FIG. 1, while the luminance signal $Y_L$ from another output of the filter 5 is fed to one input of the switching circuit 6. Meanwhile the playback luminance signal YPB from the playback processing circuit 33 is introduced to another input of the switching circuit 6, whose output os connected to the A/D converter 7.

In the recording mode, the switching circuit 6 is so actuated as to introduce the luminance signal $Y_L$ to the input of the A/D converter 7, which then converts the input analog luminance signal into an m-bit digital luminance signal and feeds the same to one input of the NR circuit 9. Meanwhile the 1-frame delay signal is outputted from the frame delay line constituting the frame comb filter 11 is fed to another input of the NR circuit 9.

The NR circuit 9 consists of a filter to mix the supplied luminance signal 8 with the 1-frame delay signal 12, thereby suppressing the noise component contained in the input signal.

Figure 3:
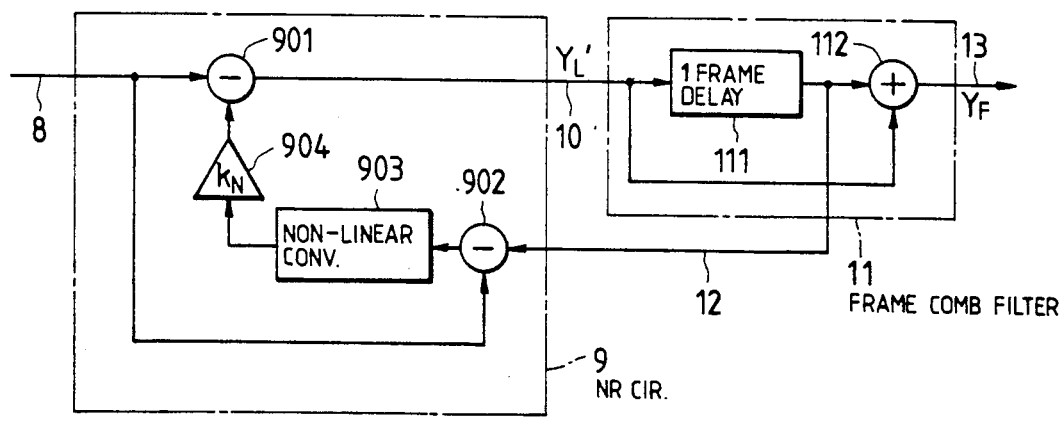
FIG. 3 is a block diagram showing respective exemplary constitutions of the noise reduction circuit 9 and the frame comb filter 11 in FIG. 1.

Exemplary constitutions of the NR circuit 9 and the frame comb filter 11 are shown in FIG. 3.

In this diagram are included a -frame delay line 111, an adder 112, subtracters 901 and 902, a non-linear conversion circuit 903, and a coefficient multiplier 904. The operation of the frame comb filter 11 will be described later.

The digital luminance signal 8 introduced from the A/D converter 8 is fed to one input of the subtracter 901 and one input of the subtracter 902 shown in FIG. 3. Meanwhile, the 1-frame delay signal 12 having a delay time of one frame with respect to the luminance signal 8 is fed to another input of the subtracter 902 from the frame delay line 111 constituting the frame comb filter 11. And the output of the subtracter 902 is fed to another input of the subtracter 901 via the non-linear conversion circuit 903 and the coefficient multiplier 904 which multiplies a constant coefficient $k_N$ ($<1$).

Consequently the subtracter 902 provides, at its output, a signal component without correlation between pixels of which positions are spatially the same but temporally different from each other. Such signal component contains both the image motion component and the noise component mixed therewith. And there occurs a trouble of blur in the motion image if the component of a greater signal level is regarded as noise in the process. For averting such a fault, the conversion circuit 903 is designed to have proper non-linear characteristic so as to reduce, in the output of the subtracter 902, the greater-level component to zero while outputting the smaller-level component directly, thereby preventing deterioration of the motion image with extraction of the noise component signal. Due to such operation, the luminance signal $Y_L'$ 10 with the suppressed noise component can be obtained at the output of the subtracter 901.

Then the luminance signal $Y_L'$ 10 thus obtained is fed to the input of the frame comb filter 11, one input of the motion detector 25 and also to one input of the mixer 14 shown respectively in FIG. 1.

The frame comb filter 11 functions to remove the color signal component, which is still left in the luminance signal $Y_L'$ 10 fed thereto, by utilizing the interframe phase inversion of the color subcarrier.

As shown in FIG. 3, the luminance signal $Y_L'$ 10 introduced from the NR circuit 9 is fed to the input of the 1-frame delay line 111 and one input of the adder 112, and then the output of the 1-frame delay line 111 is fed as a 1-frame delay signal 12 to one input of the NR circuit 9 and one input of the motion detector 9 while being fed also to another input of the adder 112. Therefore, in the adder 112, the signals of the pixels spaced apart by a 1-frame interval are added to consequently remove the color signal component without causing deterioration of the resolution.

Subsequently the motion detector 25 shown in FIG. 1 discriminates between a motion image and a still image, and outputs a coefficient signal $k_H$ ($0 \leq k_H \leq 1$).

In the motion detector 25, the difference between the signal levels is calculated, and the signal is regarded as a motion image when the level difference is great or as a still image when the level difference is small. And a coefficient signal $k_H$ is outputted with the coefficient so controlled as to increase in the case of a motion image or to decrease in the case of a still image. In this embodiment, such control can be realized with facility by the provision of a means which calculates the level difference by the use of at least the luminance signal $Y_L'$ 10 obtained from the NR circuit 9 and the 1-frame delay signal 12 from the frame comb filter 11. And the coefficient signal $k_M$ thus outputted is fed via the gate circuit 26 to one input of each of the mixers 14 and 22.

The gate circuit 26 functions in response to the first control signal CNT1, and directly outputs the coefficient signal $k_M$ fed to the input thereof in the recording mode or controls the output to maintain the coefficient at a value representing the motion image state in the playback mode.

Under an exemplary condition where the first control signal CNT1 has a value "1" in the playback mode and the all bits of the n-bit coefficient signal $k_M$ are "1" in the motion image state, the above operation can be performed with facility by connecting the individual bit lines of the coefficient signal $k_M$ to one-side inputs of the n pieces of OR circuits while connecting the signal line of the first control signal CNT1 to the other entire inputs of the OR circuits.

Accordingly, in the recording mode, the luminance signal $Y_L'$ 10 processed by both the line comb filter and the noise reduction circuit and the luminance signal $Y_F$ 13 processed by the frame comb filter are introduced to the mixer 14, which adaptively mixes the two input signals with each other by the following calculation in accordance with the coefficient signal $k_M$ obtained from the motion detector 25:

$$k_M \cdot Y_L' + (1 - k_M) \cdot Y_F \qquad (3)$$

Therefore the mixer 14 provides, at its output, the luminance signal processed by the optimal filtering with respect to the image motion, hence minimizing the disturbance derived from leakage of the color signal component as well as improving the signal-to-noise ratio.

Meanwhile the ACC circuit 17 supplied with the color signal $C_L$ from the line comb filter 5 performs such control operation that the color burst level in the color signal $C_L$ is maintained to have a predetermined amplitude, thereby optimizing the amplitude to prevent deterioration of the color signal-to-noise ratio that may otherwise be caused by any quantization error during the A/D conversion. And the output of the ACC circuit 17 is introduced to the A/D converter 18. This converter 18 serves to convert the input analog color signal into an m-bit digital color signal. The digitized color signal $C_L'$ 19 is fed to the input of the frame comb filter 20 and one input of the mixer 22, and then the output of the frame comb filter 20 is fed to another input of the mixer 22.

The frame comb filter 20 consists of a frame delay line and serves to remove the luminance signal component still left in the color signal $C_L'$ 19 fed thereto.

Figure 4:
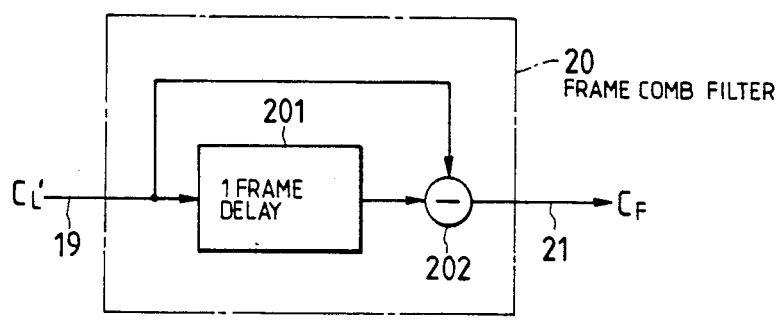
FIG. 4 is a block diagram showing an exemplary constitution of the frame comb filter 20 in FIG. 1.
Figure 7A:
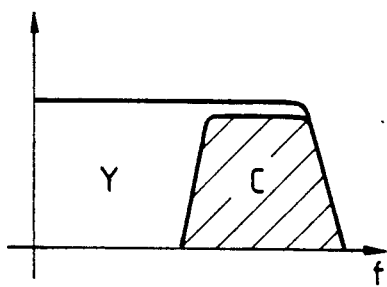
FIGS. 7A and 7B graphically represent a comparison of the frequency bands, in a pre-recording state and a post-playback state, of a luminance signal and a color signal in the composite video signal obtained by a conventional home VTR.
Figure 7B:
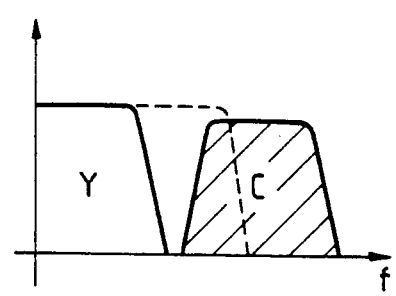

An exemplary constitution of such frame comb filter 20 is shown in FIG. 4.

In this diagram are included a 1-frame delay line 201 and a subtracter 202.

As shown in FIG. 4, the color signal $C_L'$ 19 supplied from the A/D converter 18 is fed to the input of the 1-frame delay line 201 and one input of the subtracter 202. And the output of the 1-frame delay line 201 is fed to another input of the subtracter 202, which executes a subtraction between the pixels spaced apart by one frame interval from each other, thereby achieving removal of the luminance signal component without deteriorating the resolution.

Thus, in the recording mode, both the color signal $C_L'$ 19 extracted from the composite video signal NTSC by the line comb filter and the color signal $C_F$ 21 extracted by the frame comb filter are introduced to the mixer 22, which adaptively mixes the two input signals with each other by the following calculation in accordance with the coefficient signal $k_M$ obtained from the motion detector 25:

$$k_M \cdot C_L' + (1 - k_M) \cdot C_F \qquad (4)$$

Therefore the mixer 22 provides, at its output, the color signal processed by the optimal filtering with respect to the image motion, hence attaining wide suppression of the disturbance derived from leakage of the luminance signal component.

In the next stage, the respective outputs of the mixers 14 and 22 are once converted into analog signals by the D/A converters 15 and 23, and then are introduced to the inputs of the switching circuits 16 and 24.

Another input of the switching circuit 16 is connected to the input terminal 2 to receive the luminance signal Yi introduced from an external circuit, and the output of the switching circuit 16 is connected to both the output terminal 27 and one input of the recording processing circuit 29. Meanwhile, another input of the switching circuit 24 is connected to the input terminal 3 to receive the color signal introduced from an external circuit, and the output of the switching circuit 24 is connected to both the output terminal 28 and another input of the recording processing circuit 29. Such switching circuits 16 and 24 are controlled by the output of the OR circuit 34 and serves to select the input signal which is to be fed to the output terminal.

The OR circuit 34 receives the first control signal CNT1 at its one input while receiving, at its another input, the second control signal CNT2 supplied via the input terminal 35. And the operation of the OR circuit 34 is so performed that, in the recording mode, the switching circuits 16 and 24 can be optionally selected by the second control signal CNT2. Meanwhile in the playback mode, the outputs of the D/A converters 15 and 23 are forcibly selected independently of the state of the second control signal CNT2.

The recording processing circuit 29 receives the luminance signal $Y_{REC}$ and the color signal $C_{REC}$ introduced from the switching circuits 16 and 24 respectively, and executes preemphasis, frequency modulation and so forth with regard to the luminance signal $Y_{REC}$ while executing carrier lower-frequency conversion and so forth with regard to the color signal $C_{REC}$. And after such processing, the circuit 29 frequency-multiplexes the two signals and feeds the same to one input of the switching circuit 30.

In the recording mode, the switching circuit 30 functions to feed the output of the recording processing circuit 29 to the head 31, whereby the signal is recorded on the magnetic tape 32.

In the manner described above, the operation can be performed for recording on the magnetic tape 32 the entirety of the composite video signal NTSC fed via the input terminal, the luminance signal Yi and the color signal Ci from the input terminals 2 and 3 respectively. Since the recorded signals are outputted from the terminals 27 and 28, the user is enabled to monitor high-quality picture by connecting the luminance signal output terminal 27 and the color signal output terminal 28 respectively to the luminance signal input terminal and the color signal input terminal of the TV receiver.

Now a description will be given with regard to the playback operation.

In reproducing the recorded magnetic tape 32, the first control signal CNT1 is switched to a value (e.g. "1") representing the playback mode. Then the switching circuit 30 is so driven as to introduce the signal, which has been reproduced from the magnetic tape 32 by the head 31, to the input of the playback processing circuit 33, while each of the switching circuits 4 and 6 selects the input reverse to the one in the recording mode.

For the purpose of preventing the color signal deterioration caused by the interframe processing due to the harmful influence of some time-base variation in the playback mode and also preventing the motion image deterioration derived from the adaptive processing, the output of the gate circuit 26 is set fixedly at the coefficient value which represents the motion image state.

The switching circuits 16 and 24 are controlled by the output of the OR circuit 34 and select the outputs of the D/A converters 15 and 23.

In the playback processing circuit 33, the playback signal read out from the magnetic tape 32 is processed through the high pass filter (HPF) and the low pass filter (LPF) so as to be divided into the frequency-modulated luminance signal and the lower-frequency converted color signal. And frequency demodulation, deemphasis and so forth are executed with regard to the frequency-modulated luminance signal, while inverse conversion and so forth are executed with regard to the lower-frequency converted color signal, whereby a playback luminance signal $Y_{PB}$ and a playback color signal $C_{PB}$ are outputted.

The playback luminance signal $Y_{PB}$ processed through the A/D converter 7 is then fed to the NR circuit 9 where noise reduction is performed. Subsequently, since the output of the gate circuit 26 is set fixedly at the coefficient value representing the motion image state as mentioned, merely the output signal 10 of the NR circuit 9 is obtained from the mixer 14 and then is introduced via the D/A converter 15 and the switching circuit 16 to the output terminal 27.

Meanwhile in the playback color signal $C_{PB}$, the crosstalk component from the adjacent track is removed by the line comb filter 5, and then the amplitude is controlled by the ACC circuit 17 so as not to cause any color saturation change that may otherwise be induced by some variation in the amplitude of the playback signal. Thereafter, since the output of the gate circuit 26 is set fixedly at the coefficient value representing the motion image state as mentioned, merely the signal 19 obtained from the ACC circuit 17 via the A/D converter 18 is outputted from the mixer 22 and is introduced via the D/A converter 23 and the switching circuit 24 to the output terminal 28.

According to this embodiment, when recording the composite video signal, its optimal separation into the luminance signal and the color signal can be carried out in compliance with the image motion to consequently accomplish ideal suppression of the mutual interference between the luminance signal and the color signal. Furthermore, in both the recording mode and the playback mode, the luminance signal-to-noise ratio can be improved and, because of the configuration where the luminance signal and the color signal are outputted individually from the independent terminals 27 and 28, each of the recording signal and the playback signal can be obtained with a high image quality.

Moreover, the NR circuit 9 and the line comb filter 5 are usable in common to both the recording and playback modes, so that it becomes possible to reduce the circuit constitution scale and the production cost as well.

In addition to the above, due to the provision of the switching circuits 16 and 24, the luminance signal Yi and the color signal Ci fed respectively via the input terminals 2 and 3 from external circuits can be recorded without the necessity of being multiplexed in the same frequency band, hence achieving an enhanced image quality in a dubbing mode.

In this embodiment, when the playback processing circuit 33 includes a comb filter for removing the disturbance of the playback color signal from the adjacent track, the playback color signal $C_{PB}$ need not be introduced, during the playback mode, to the input of the line comb filter 5, and it may be introduced directly to the input of the ACC circuit 17 or the A/D converter 18.

The above embodiment is so contrived that, during the playback mode, the mixers 14 and 22 are forcibly locked in a motion image state. However, since the mixer 14 serves to mix the luminance signal, it is preferred that such forcible lock in the motion image state be not executed by the gate circuit 26 so as to further improve the signal-to-noise ratio of the luminance signal obtained at the output of the mixer 14.

When the apparatus of the present invention is connected to an external television receiver or the like, the connection is possible via two independent paths while the luminance signal and the color signal are maintained independent of each other without the necessity of being converted again into the composite video signal for connection via a single path, so that there occurs no mutual interference between the luminance signal and the color signal.

And in the dubbing mode, the playback signals obtained from the first and second output terminals are introduced to two component input terminals in another VTR, and thus the luminance signal and the color signal can be dubbed without being converted into the composite video signal, thereby accomplishing enhancement of the image quality in the dubbing mode.

Now a second exemplary embodiment of the present invention will be described below with reference to FIG. 5, which is a block diagram showing its constitution.

In this diagram, there are included switching circuits 37, 38 and 39, and all other elements are the same as those employed in the aforementioned first embodiment.

Figure 5:
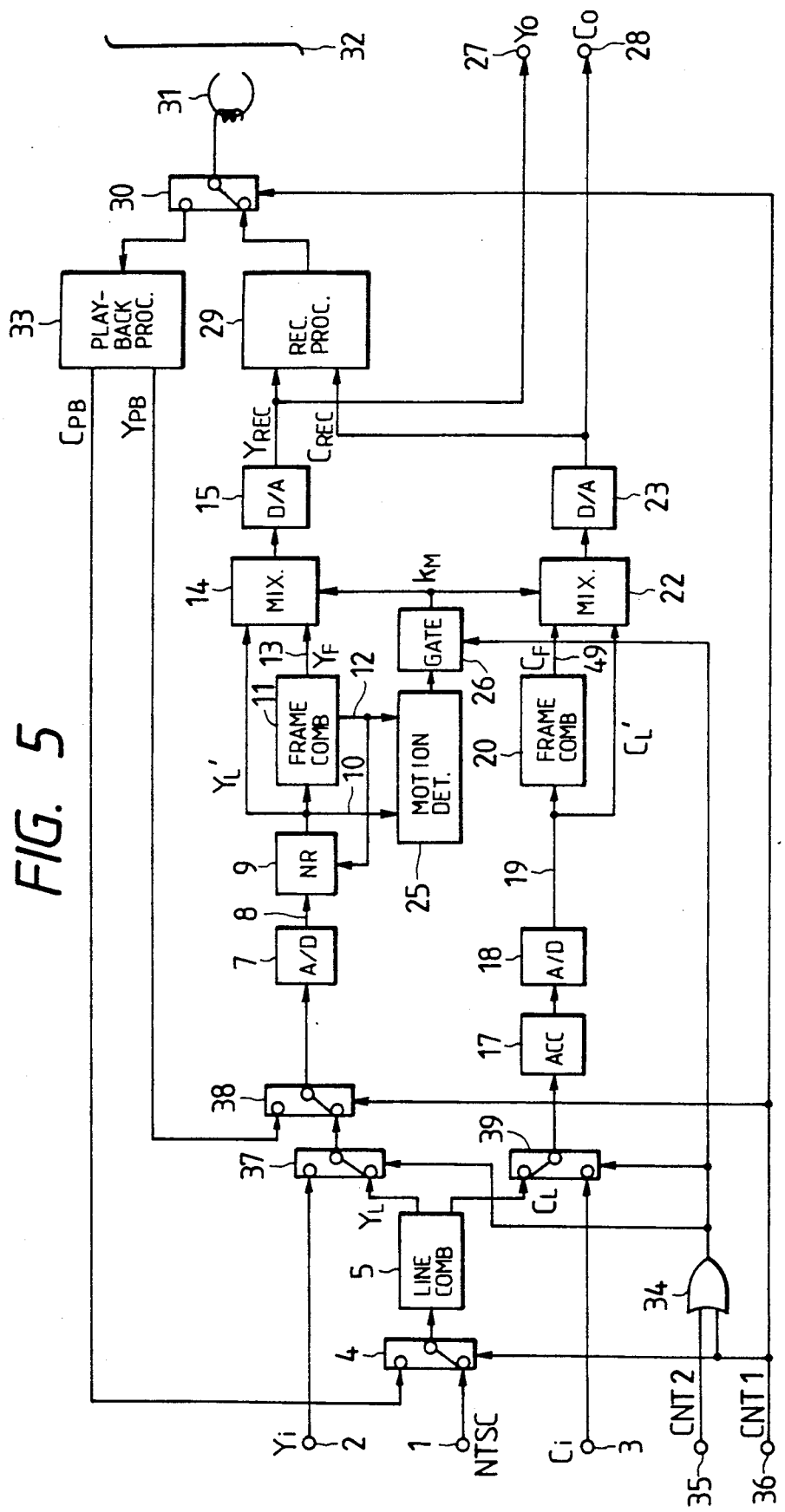
FIG. 5 is a block diagram of a second embodiment according to the invention.

In the second embodiment, as shown in FIG. 5, one input of the switching circuit 37 is connected to the input terminal 2, and the luminance signal Yi supplied from an external circuit is introduced thereto, while the luminance signal $Y_L$ separated by the line comb filter 5 is introduced to another input of the switching circuit 37, whose output is connected to one input of the switching circuit 38. Meanwhile the playback luminance signal $Y_{PB}$ from the playback processing circuit 33 is introduced to another input of the switching circuit 38, whose output is connected to the input of the A/D converter 7.

One input of the switching circuit 39 is connected to the input terminal 3, and the color signal $C_i$ supplied from an external circuit is introduced thereto, while the color signal $C_L$ separated by the line comb filter 5 is introduced to another input of the switching circuit 39, whose output is connected to the input of the ACC circuit 17.

And the outputs of both the motion detector 25 and the OR circuit 34 are connected to the input of the gate circuit 26.

The switching circuits 37 and 39 are controlled by the output of the OR circuit 34 and so function as to optionally select the input during the recording mode in accordance with the value of the second control signal CNT2, or to select, during the playback mode, the input connected forcibly to the output of the line comb filter 5.

The switching circuit 38 is controlled by the first control signal CNT1 and so functions as to select, during the recording mode, the input connected to the switching circuit 37 as illustrated, or to select the inverse input during the playback mode.

The gate circuit 26 is controlled by the output of the OR circuit 34 and, in the playback mode or the recording mode, locks the coefficient signal $k_M$ forcibly in a motion image state when selecting the inputs which connect the switching circuits 37 and 39 to the input terminals 2 and 3 in response to the second control signal CNT2.

Accordingly, in the recording mode, the luminance signal $Y_i$ received from the input terminal 2 can be introduced via the NR circuit 9 to the recording processing circuit 29 and the output terminal 27, hence improving the signal-to-noise ratio in the recording mode. Also the color signal $C_i$ received from the input terminal 3 is introduced via the ACC circuit 17 to the recording processing circuit 29 and the output terminal 28, whereby the color-signal recording level can be stabilized.

Thus, according to the second embodiment of the invention, the same advantageous effects as those in the aforementioned first embodiment are also attainable. And in recording the luminance signal $Y_i$ and the color signal $C_i$ received from external circuits via the input terminals 2 and 3 respectively, it is possible to improve the signal-to-noise ratio as well as to stabilize the color-signal recording level to consequently enhance the image quality.

Now a third embodiment of the present invention will be described below with reference to FIG. 6, which is a block diagram of its exemplary constitution.

In this diagram, there are included a color demodulator 40, A/D converters 41 and 42, a multiplexer 43, an NR circuit 45, a frame comb filter 48, a demultiplexer 50, D/A converters 51 and 52, and a color modulator 53. All other elements are the same as those employed in the foregoing embodiment.

Figure 6:
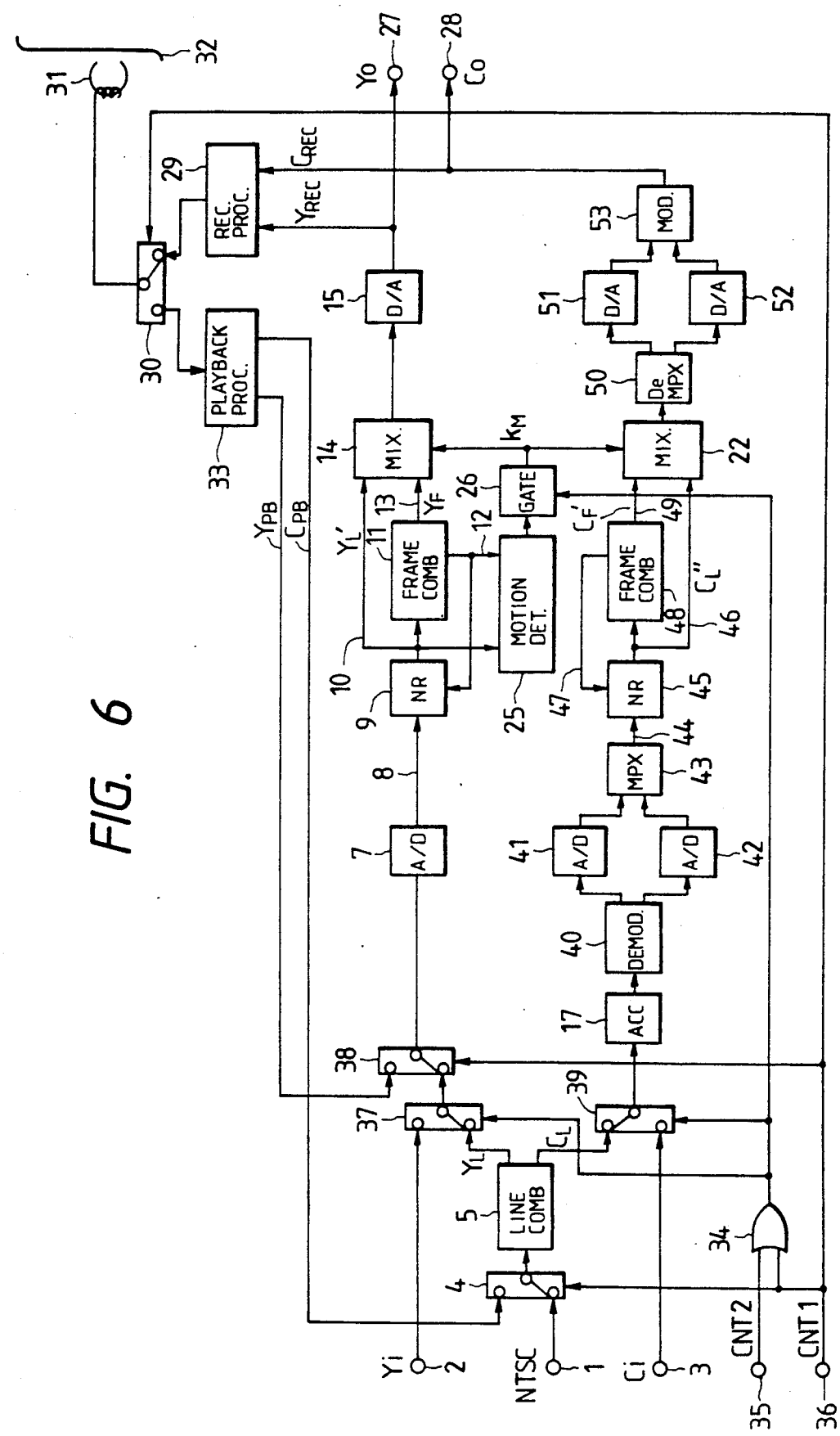
FIG. 6 is a block diagram of a third embodiment according to the invention.

In the third embodiment, when the recording mode is selected by the first control signal CNT1 and the input for the composite video signal is selected by the second control signal CNT2 as shown in FIG. 6, the luminance signal $Y_L$ separated by the line comb filter 5 is introduced to the input of the A/D converter 7 and then is processed in the same manner as in the foregoing embodiment. And subsequently, the signal thus processed is introduced to the recording processing circuit 29 and the output terminal 27.

Meanwhile the color signal $C_L$ separated by the line comb filter 5 is processed by the ACC circuit 17 in the same manner as in the aforesaid embodiment and then is introduced to the input of the color demodulator 40.

The color demodulator 40 serves to demodulate the input color signal and the outputs the base-band color difference signals $R-Y$ and $B-Y$. The color difference signals $R-Y$ and $B-Y$ thus demodulated are converted into digital signals by A/D converters 41 and 42 respectively and then are introduced to the multiplexer 43, which produces a time-division multiplex output by processing the input color difference signals $R-Y$ and $B-Y$ on the basis of, for example individual pixels.

Each of the demodulated color signals $R-Y$ and $B-Y$ has a frequency band of 0 to 0.5 MHz or so which is narrower than that of the luminance signal $Y_L$. Therefore, when the luminance signal $Y_L$ is digitized by the A/D converter 7 after being sampled at a frequency of 4 $f_{sc}$ (about 14.32 MHz) which is four times the color subcarrier frequency $f_{sc}$ (about 3.58 MHz), no problem arises if the color difference signals $R-Y$ and $B-Y$ are digitized by the A/D converters 41 and 42 after being sampled at 2 $f_{sc}$ (about 7.16 MHz) which is half the color subcarrier frequency $f_{sc}$. In such a case, the color difference signals $R-Y$ and $B-Y$ are time-division multiplexed by the multiplexer 43, so that the period of each pixel of the multiplexed color difference signal is rendered equal to the period of the luminance signal, whereby the burden is thereafter eliminated to the operating frequency of the digital processing circuit.

The output of the multiplexer 43 is connected to one input of the NR circuit 45, and the time-division multiplexed color difference signal 44 is introduced thereto. Meanwhile, the 1-frame delay signal 47 outputted from the frame comb filter 48 is fed to another input of the NR circuit 45.

The NR circuit 45 functions in the same manner as the aforementioned NR circuit 9 which suppresses the noise in the luminance signal as described previously in connection with the foregoing embodiment. As for the constitution, it is possible to apply the exemplary one of the NR circuit 9, which is shown in FIG. 3, directly to the NR circuit 45 as well.

Subsequently the output $C_L''$ 46 of the NR circuit 45 is fed to both the input of the frame comb filter 48 and one input of the mixer 22.

The signal $C_L''$ 46 inputted to the frame comb filter 48 is a time-division multiplex color difference signal demodulated to the base band, so that the interframe color difference signal components have an in-phase relation while the interframe luminance signal components have an opposite-phase relation. Consequently, the requirement for the frame comb filter 48 to extract the color difference signal alone is the capability of performing the same separation as that of the frame comb filter 11. And the aforementioned exemplary constitution of the frame comb filter 11 shown in FIG. 3 is applicable directly to the filter 48 also.

In the next stage, the output signal $C_L''$ 46 of the NR circuit 45 is fed to one input of the mixer 22, while the signal $C_F'$ 49 processed by the frame comb filter 48 is fed to another input of the mixer 22.

The mixer 22 performs the same operation as in the foregoing embodiment. Consequently, at the output of the mixer 22, there is obtained the satisfactory color difference signal of an improved signal-to-noise ratio filtered optimally for the image motion and suppressed ideally with respect to the luminance signal component.

The time-division multiplexer color difference signal outputted from the mixer 22 is introduced to the input of the demultiplexer 50 where the input signal is separated into two color difference signals $R-Y$ and $B-Y$, which are converted into analog signals by the D/A converters 51 and 52 respectively and then are introduced to the inputs of the color modulation circuit 53.

The color modulation circuit 53 carries out orthogonal two-phase modulation of the two input color difference signals $R-Y$ and $B-Y$ by the color subcarrier $f_{sc}$ (about 3.58 MHz) and feeds the output signal to both the recording processing circuit 29 and the output terminal 28. The recording processing circuit 29 performs the same operation as in the foregoing embodiment and processes the demodulated color signal so as record the same with the luminance signal on the magnetic tape 32.

When the luminance signal $Y_i$ and the color signal $C_i$ supplied from external circuits via the input terminals 2 and 3 respectively are selected by the second control signal CNT2 in the recording mode, the luminance signal $Y_i$ received via the input terminal 2 is introduced to the input of the A/D converter 7, while the color signal $C_i$ received via the input terminal 3 is introduced to the input of the ACC circuit 17. And thereafter the individual signals are processed in the same manner as in the foregoing embodiment and then are introduced to the output terminals 27 and 28 respectively while being fed to the recording processing circuit 29 which processes such signals so as to record the same on the magnetic tape 32.

Meanwhile in the playback mode, the switching circuits 4, 37, 38, 39, 30 and the gate circuit 26 are controlled in the same manner as in the foregoing embodiment.

Accordingly the playback luminance signal $Y_{PB}$ is introduced to the input of the A/D converter 7 and, after reduction of the noise by the NR circuit 10, the signal $Y_{PB}$ is introduced to the output terminal 27. As for the playback color signal $C_{PB}$, the crosstalk from the adjacent track is removed by the line comb filter 5 while the signal amplitude is optimized by the ACC circuit 17 and, after noise reduction executed by the NR circuit 45, the playback color signal $C_{PB}$ thus processed is introduced to the output terminal 28.

Thus, according to the third embodiment of the present invention, advantageous effects similar to those in the foregoing embodiments can be attained with improvement in the color signal-to-noise ratio, hence ensuring remarkable enhancement in the image quality of both the recording signal and the playback signal.

Furthermore, in the third embodiment where the color signal is processed after being once demodulated to the base-band signal, there occurs, differing from the foregoing embodiment, none of the color signal deterioration that may otherwise be caused by the interframe processing due to the harmful influence of some time-base variation in the playback mode. Therefore, it is not necessary in the playback mode to forcibly set the mixers 14 and 22 in the motion image state by the gate circuit 26 and, on the contrary, no execution of such setting brings about a better result in improving the signal-to-noise ratios with regard to both the luminance signal and the color signal obtained respectively at the outputs of the mixers 14 and 22.

In the third embodiment, it is obvious that no problem arises if the aforementioned constitution of FIG. 1 is applied to the paths for introducing the luminance signal $Y_i$ and the color signal $C_i$, which are supplied from external circuits via the input terminals 2 and 3 respectively, to the recording processing circuit 29.

The description given above on each of the preferred embodiments is concerned with an exemplary case of applying the present invention to one recording system with conversion of the carrier color signal into a lower-frequency range. However, it is to be understood that the present invention is applicable not merely to such recording system alone but also to another recording system which, for example, separates a composite video signal into a luminance signal and a color signal and records the separated signals on individual tracks.

As mentioned hereinabove, according to the present invention, remarkable advantages are attainable in minimizing the mutual interference between the luminance signal and the color signal as well as in widely improving the signal-to-noise ratio without causing deterioration of the resolution. Therefore, great effects can be achieved particularly for realizing a high image quality in a home VTR of the type that records the luminance signal in a wide band.

What we claim is:

1. A television signal recording/reproducing apparatus comprising:
   a line comb filter fed with an analog composite video signal via an input terminal and separating said composite video signal into a luminance signal and a color signal by interline calculation;
   first and second analog-to-digital converters for converting into digital signals the luminance signal and the color signal separated by said line comb filter;
   a noise reduction circuit fed with the output signal of said first analog-to-digital converter and removing a noise component from said output signal;
   a first frame comb filter fed with the output signal of said noise reduction circuit and removing a residual color signal component in said output signal by calculating interframe signals;
   a first mixer for mixing the input signal and the output signal of said first frame comb filter with each other;
   a first digital-to-analog converter for converting the output digital signal of said first mixer into an analog signal;
   a second frame comb filter fed with the output signal of said second analog-to-digital converter and removing a residual luminance signal component in the output signal by calculating interframe signals;

a second mixer for mixing the input signal and the output signal of said second frame comb filter with each other;

a second digital-to-analog converter for converting the output digital signal of said second mixer into an analog signal;

control means for controlling signal mixing ratios in said first and second mixers;

a recording processing circuit for carrying out predetermined recording processes for the output signals of said first and second digital-to-analog converters;

recording/playback means for magnetically recording the output signal of said recording processing circuit on a recording medium, and reproducing the signal recorded on said recording medium; and a playback processing circuit for carrying out predetermined playback processes for the signal reproduced by said recording/playback means.

2. The apparatus according to claim 1, wherein said control means controls the signal mixing ratios in said first and second mixers in accordance with an interframe level difference in said luminance signal.

3. The apparatus according to claim 1, wherein said playback processing circuit separates the reproduced signal into the luminance signal and the color signal, and the separated luminance signal is outputted to an external circuit via said first analog-to-digital converter, noise reduction circuit, first frame comb filter, first mixer and first digital-to-analog converter; while the separated color signal is outputted to an external circuit via said second analog-to-digital converter, second frame comb filter, second mixer and second digital-to-analog converter.

4. The apparatus according to claim 3, wherein the luminance signal separated by said playback processing circuit is inputted to said first analog-to-digital converter via a switch.

5. The apparatus according to claim 3, wherein the color signal separated by said playback processing circuit is inputted to said second analog-to-digital converter via said line comb filter.

6. The apparatus according to claim 1, further comprising terminals to receive a luminance signal and a color signal individually from external circuits, wherein the external luminance signal received via the luminance-signal input terminal is inputted to said recording processing circuit via said first analog-to-digital converter, noise reduction circuit, first frame comb filter, first mixer and first digital-to-analog converter; while the external color signal received via the color-signal input terminal is inputted to said recording processing circuit via said second analog-to-digital converter, second frame comb filter, second mixer and second digital-to-analog converter.

7. The apparatus according to claim 1, further comprising: a color demodulation circuit for demodulating into a color difference signal the color signal to be converted by said second analog-to-digital converter; a second noise reduction circuit for removing a noise component contained in the output signal of said color demodulation circuit wherein the output signal of said noise reduction circuit is fed to said second frame comb filter; and a color modulation circuit for modulating the output color difference signal of said second digital-to-analog converter into a color signal, wherein the output signal of said color modulation circuit is fed to said recording processing circuit.

* * * * *